United States Patent Office 3,639,392
Patented Feb. 1, 1972

3,639,392
CARDIOACTIVE OXIDO-BUFATRIENOLIDES
Werner Fritsch, Neuenhain, Taunus, Werner Haede, Hofheim, Taunus, Kurt Radscheit, Kelkheim, Taunus, Ulrich Stache, Hofheim, Taunus, and Ernst Lindner, Frankfurt am Main, Germany, assignors to Farbwerke Hoechst Aktiengesellschaft vormals Meister Lucius & Bruning, Frankfurt am Main, Germany
No Drawing. Filed Dec. 2, 1969, Ser. No. 881,583
Claims priority, application Germany, Dec. 5, 1968, P 18 12 946.9
Int. Cl. C07c 173/04
U.S. Cl. 260—239.57
2 Claims

ABSTRACT OF THE DISCLOSURE

Cardioactive oxido-cardadienolides and oxido-bufatrienolides of the formula

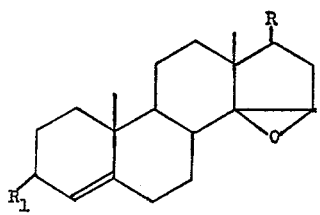

(I)

wherein R is a cardenolide or bufadienolide ring and $R_1$ is —OH in the $\beta$-position or keto. Methods of making such compounds. As specific oxido-bufatrienolides: 3-oxo-14,15$\beta$ - oxido - bufa - 4,20(21),22(23) - trienolide; 3$\beta$-hydroxy-14,15$\beta$-oxido-bufa-4,20(21),22(23)-trienolide.

The present invention relates to oxido-cardadienolides or oxido-bufatrienolides of the Formula I

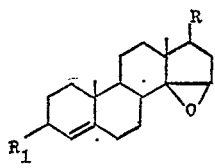

(I)

in which R represents the cardenolide or bufadienolide ring, and $R_1$ represents an OH group in $\beta$-position or a keto group.

The present invention also provides a process for the manufacture of the above-specified compounds of the Formula I, wherein (a) 3 - oxo - carda - 4,14,20(22) - trienolides or 3 - oxo - bufa - 4,14,20(21),22(23) - tetraenolides of the Formula II are treated with N-halogenocarboxylic acid amides or hypohalogenous acids, the 14,15-halohydrins obtained are treated with agents that split off hydrogen bromide, or (b) compounds of the Formula II are converted by means of per-acids into the corresponding 14,15$\alpha$-oxido-compounds, these are treated with acid agents, the 14$\beta$-15$\alpha$-dihydroxy-compounds that have formed are transformed with the aid of sulfochloride into the corresponding 14$\beta$-hydroxy-15$\alpha$-sulfonic acid esters, and from the latter the sulfonic acid radical is separated.

If the corresponding 3$\beta$-hydroxy-compounds are desired, the 3 - oxo - 14,15$\alpha$ - oxido - carda - 4,20(22) - dienolides or 3 - oxo - 14,15$\beta$ - oxido - bufa - 4,20(21),22(23)-trienolides obtained according to (a) or (b) are reduced with the aid of metal hydrides.

The separate process steps are compiled below in schematic form:

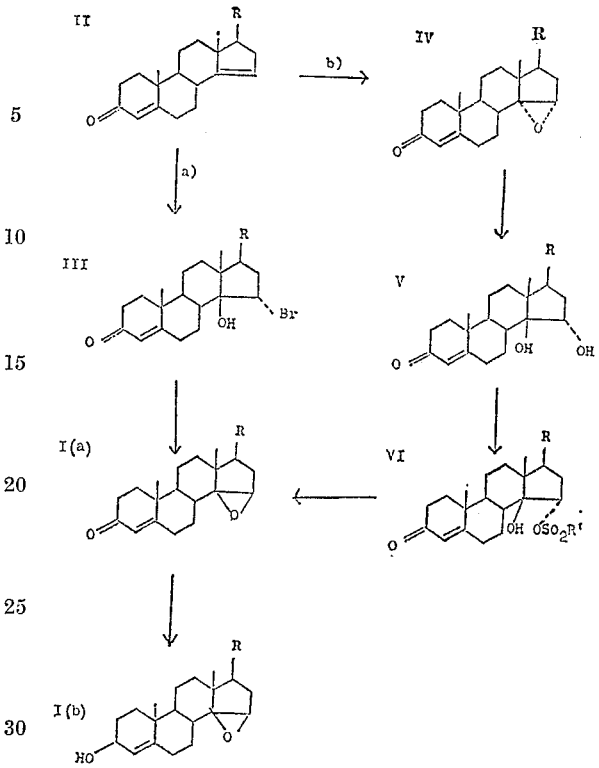

In the above formulas, R' stands for the radical of a sulfonic acid.

(a) The reaction of the starting substances of Formula II with N-halogeno-amides or hypohalogenous acids according to variant (a) is carried out in a manner similar to that used for analogous cases (cf. Engel and Bach, "Steroids," volume 3, page 593), for example with N-bromo-acetamide in the presence of perchloric acid or also, advantageously, with N-bromosulfonamides of an aromatic sulfonic acid, for example N,N-di-bromo-benzene-sulfonamide in a weakly acid medium, in inert solvents.

The bromohydrins of the Formula III so obtained may be converted either directly in the reaction mixture or after precipitation with water, without purification, by means of weak alkali, for example a mixture of sodium acetate and glacial acetic acid in methanol having a pH-value of 7.4 or by treatment with basic or neutral or acid aluminium oxide as that used in chromatography, in a solvent which is inert towards aluminum oxide, into the 14,15$\beta$-oxido-compounds of the Formula Ia. There may, of course, also be used other agents that split off HBr, for example organic bases such as pyridine, triethylamine or 4,5-diaza-bicyclo-[4,3,0]-nonene or alkalis.

(b) For converting the starting substances of Formula II into the 14,15$\alpha$-oxido-compounds of Formula IV according to (b), there may be used, for example mono-perphthalic acid, perbenzoic acid or mono-chloro-perbenzoic acid. The splitting of the epoxide compounds of the Formula IV yielding the diols of Formula V is effected with acids such as perchloric acid, sulfuric acid, hydrochloric acid or p-toluene-sulfonic acid in solvents such as dioxane, tetrahydrofurane, methanol, or acetone, with or without addition of water. For preparing the sulfonates of Formula VI from V, methane-sulfonic acid chloride or p-toluene-sulfonic acid chloride is preferably used. The separation of the sulfonic acid radical can be effected by treatment of the sulfonates with silica gel, aluminum oxide, sodium acetate or sodium carbonate.

If desired, the oxo-compounds of the Formula Ia can be reduced selectively to the corresponding hydroxy compounds of the Formula Ib. For this purpose, metal hydrides, preferably sodium boron hydride, lithium boron hydride or lithium-tritert.butoxy-aluminum hydride are used. As the reaction medium especially ethers, for example diethyl ether, dioxane or tetrahydrofurane, are used. The reaction time ranges from 1 to several hours, the reaction temperature is in the range of between —20° C. and the boiling temperature of the ether used.

The compound of Formula II, in which R stands for the bufa-dienolide group, can be prepared starting from the known 15α-hydroxy-desoxy-corticosterone according to the process described in U.S. patent application Ser. No. 735,964, filed by K. Radscheit et al. on June 11, 1968, by successive oxidation of the 21-hydroxyl group, acetalization of the corresponding 21-aldehyde group, tosylation of the hydroxyl group in 15α-position, formation of the Δ14-double bond by splitting off of toluene-sulfonic acid by means of lithium carbonate, protection of the 3-keto group by enol-ester formation with ortho-formic acid ester, formation of the 20,22-epoxide with trimethyl-sulfonium iodide/NaH, simultaneous separation of the acetal and enol-ester groups and cleavage of the epoxide ring with HBr, restoration of the 20,22-epoxide ring by treating the bromohydrine thus formed with triethylamine, selective condensation of the 21-aldehyde group with carbomethoxy-methyl-diethyl phosphonate to the 21-carbomethoxy-methylene compound with conservation of the 3-keto-group, isomerization of the 20,22-epoxide ring to the 22-aldehyde with the aid of boron-trifluoride etherate and ring closure to compound II by means of aqueous methanolic HCl.

The individual steps of the synthesis are shown by the following formula scheme:

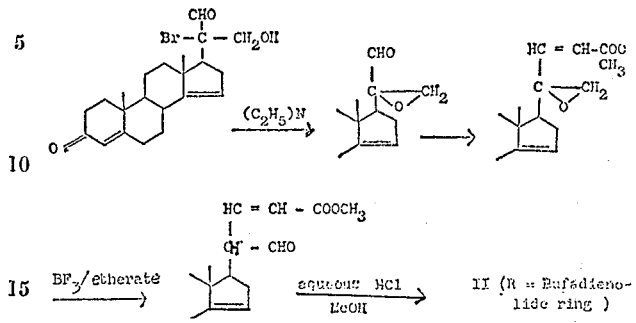

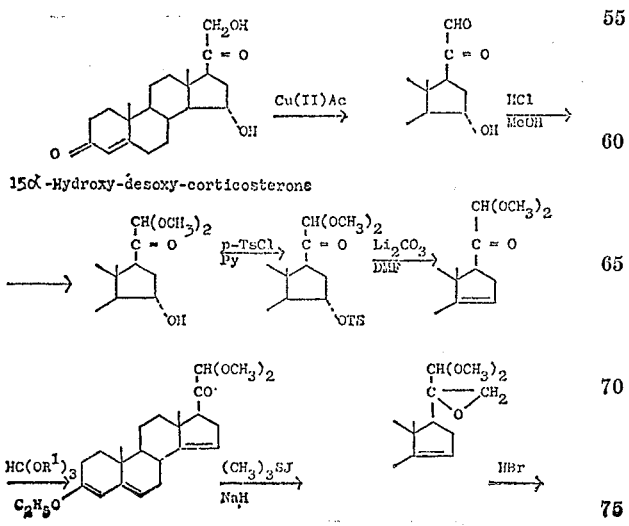

The corresponding cardenolide of Formula II may be prepared according to the process described in Belgian Pat. 695,311 starting from 15α-hydroxy-desoxy-corticosterone by reaction with a sulfochloride, substitution of the sulfonic acid ester group for the malonic acid semiester grouping and ring closure of the latter by means of an organic base, according to the following scheme:

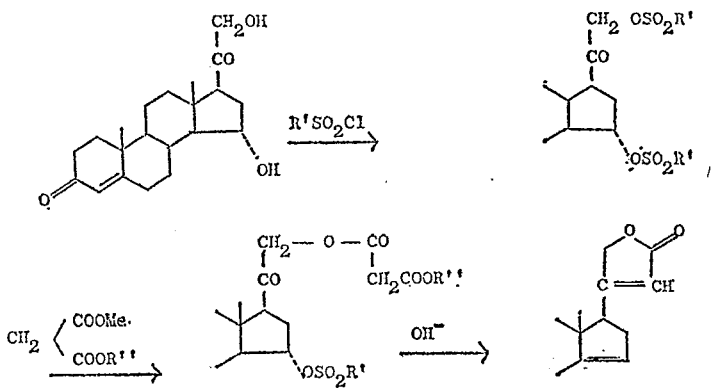

The products obtained according to the present invention are novel and they are distinguished by a strongly positive inotropic action and as a consequence thereof, a strongly marked cardioactivity. They, therefore, are suitable for the medicinal treatment of heart damages, especially of cardiac insufficiency and tachycardia. They are preferably administered in the form of tablets or dragées which contain, in addition to the active substances, the usual adjuvants and excipients, for example, lactose, starch, tragacanth, etc.

The products of the invention may also be used as intermediates in the manufacture of medicaments, for example by conversion of the 3-hydroxy compounds into corresponding derivatives of the 3-hydroxy group known in steroid chemistry, for example ethers or esters.

The following examples illustrate the invention:

EXAMPLE 1

3-oxo-14,15β-oxido-carda-4,20(22)-dienolide (A) 9.28 ml. of 0.39 N-perchloric acid were introduced, while stirring, at about 15–18° C., into a suspension of 5.64 g. of 3-oxo-carda-4,14,20(22)-trienolide (melting point 275–278° C.) in 57 ml. of peroxide-free dioxane. Then, 2.54 g. of N-bromoacetamide were added likewise at 15–18° C., while stirring and with exclusion of light, within 30 minutes. The whole was stirred for 1 hour at 15–18° C., then for 3–5 minutes while cooling with ice and the reaction mixture was then poured, while stirring, into a mixture of 200 g. of ice and 200 ml. of water. The crude 3-oxo-14β-hydroxy - 15α - bromo-carda-4,20(22)-dienolide that had precipitated was filtered off with suction and washed with water. The filter residue was dissolved in 40 ml. of methylene chloride and the solution was separated from the water still present. The organic phase was combined with 210 ml. of 95% methanol, then 10 ml. of a buffer mixture of 139 g. of sodium acetate (containing 3 mols of crystal water), 690 ml. of methanol and 25 ml. of glacial acetic acid were added. The pH-value was maintained at 7 by occasional addition of buffer solution of the above composition. After 3 hours, the solution was concentrated to a small volume in a rotary evaporator. The residue was dissolved in a mixture of methylene chloride and ether, washed with water and, after drying with sodium sulfate, was evaporated to dryness under reduced pressure. After recrystallization of the crude product from a mixture of methylene chloride and methanol, 3.42 g. of 3-oxo-14,15β-oxido-carda-4,20(22)-dienolide melting at 208–212° C. were obtained.

(B) 6.36 ml. of glacial acetic acid and immediately thereafter 7.82 g. of N,N-dibromo-benzenesulfonamide were added at +2° C., while stirring and with exclusion of light, to a suspension of 9 g. of 3-oxo-carda-4,14,20-(22)-trienolide in 300 ml. of peroxide-free dioxane and 54 ml. of water. Then, the whole was stirred for 1 hour under the same conditions. The reaction mixture was poured into a solution of 50 ml. of saturated sodium thiosulfate solution in 1.4 l. of ice-cold water and extracted three times by shaking with 150 ml. portions of methylene chloride. The extracts were washed three times with ice-cold water, dried over sodium sulfate and concentrated under reduced pressure to about 120 ml. at as low a bath temperature as possible (about 30–40° C.). After addition of 320 ml. of methanol and 8 ml. of water, 66 ml. of the above buffer solution and 20 ml. of a saturated aqueous sodium acetate solution were added. The whole was stirred for 3 hours and worked up as described above. After recrystallization from a mixture of methylene chloride and methanol, 5.96 g. of 3-oxo-14,15β-oxido-carda-4,20(22)-dienolide melting at 208–212° C. were obtained.

EXAMPLE 2

3β-hydroxy-14,15β-oxido-carda-4,20(22)-dienolide 77 ml. of a solution of lithium-aluminum-tri-tert.-butoxyhydride in tetrahydrofurane (containing 145 mg. per ml., determined by iodometric titration) were added within 15 minutes while stirring, to a solution of 1.5 g. of 3-oxo-14,15β-oxido-carda - 4,20(22) - dienolide in 150 ml. of absolute tetrahydrofurane that had been cooled to −5° C. The whole was then stirred for 2 hours and 40 minutes while cooling with ice and, while continuing stirring and cooling, a mixture of 58 ml. of water and 3.51 ml. of glacial acetic acid was added dropwise. The whole was heated to room temperature and stirred for 45 minutes. The reaction mixture was combined with an equal volume of water and filtered with suction through a clarifying filter. The filter residue was well washed with methylene chloride and the filtrate was likewise well extracted by shaking with methylene chloride. The combined methylene chloride extracts were dried under reduced pressure and evaporated. The residue was recrystallized from a mixture of methylene chloride and methanol with addition of one drop of pyridine. Yield: 1.04 g., melting point: 212–226° C.

EXAMPLE 3

3-oxo-14,15β-oxido-bufa-4,20(21),22(23)-trienolide (a) 3-oxo-14,15α-oxido-bufa-4,20(21),22(23)-trienolide (14,15α-oxido-scillarenone)

200 mg. of 14-anhydro-scillarenone (3-oxo-bufa-4,14,20(21),22(23)-tetraenolide) were dissolved in 25 ml. of methylene chloride and combined with a solution of 264 mg. of monoperphthalic acid in ether. The solution was allowed to stand for 2¾ hours at room temperature, washed with a solution of sodium bicarbonate and water, dried over sodium sulfate and evaporated to dryness under reduced pressure. The residue was filtered over neutral aluminum oxide having the activity degree II and eluted with benzene. The eluates were combined and evaporated, the residue was dissolved in a very small amount of hot methanol, the solution was combined, after having cooled, with ether and the crystalline product that had precipitated was isolated. 110 mg. of product melting at 188–190° C. were obtained.

Infrared spectrum: 1700–1745 cm.$^{-1}$, 1650–1670 cm.$^{-1}$, 1605–1610 cm.$^{-1}$, 1525 cm.$^{-1}$, 925 cm.$^{-1}$, 815$^{-1}$, 870 cm.$^{-1}$.

Ultraviolet spectrum: 297 m$\mu$ (5925), 238 m$\mu$ (18700).

(b) 3-oxo-14β,15α-dihydroxy-bufa-4,20(21),22(23)-trienolide (15α-hydroxy-scillarenone)

90 mg. of 14,15α-oxido-scillarenone were dissolved in 1.5 ml. of dioxane; the solution was combined with 0.25 ml. of binormal H$_2$SO$_4$ and allowed to stand for 43 hours at room temperature, then combined with water and extracted with methylene chloride. The abstract was washed, dried, evaporated and the residue was recrystallized from a small amount of hot methylene chloride. 40 mg. of product melting at 286–288° C. were obtained.

Infrared spectrum: 3500, 3380–3400, 1700–1720, 1640–1660, 1605–1610, 1530 cm.$^{-1}$.

(c) 3-oxo-14β-hydroxy-15α-methane-sulfonoxy-bufa-4,20(21),22(23)-trienolide (15α-methane-sulfonoxy-scillarenone)

100 mg. of 15α-hydroxy-scillarenone were dissolved in 10 ml. of acetone, the solution was combined with 0.4 ml. of pyridine and 200 mg. of methane-sulfonic acid chloride and stirred for 8 hours at 0° C. The whole was then poured onto ice, extracted with methylene chloride, the extracts were washed successively with water, dilute hydrochloric acid, water, sodium bicarbonate solution and again water, dried over sodium sulfate and evaporated under reduced pressure at 35° C. 100 mg. of amorphous mesylate were obtained.

Infrared spectrum: 1165 cm.$^{-1}$.

(d) 3-oxo-14,15β-oxido-bufa-4,20(21),22(23)-trienolide (14,15β-oxido-scillarenone)

270 mg. of 15α-methane-sulfonoxy-scillarenone were chromatographed on 12 g. of SiO$_2$. Elution was effected with benzene and methylene chloride, the eluates were evaporated to dryness and the residue was triturated with ether. Crystals melting at 169–172° C. were obtained.

Infrared spectrum: 1700–1745, 1650–1670, 1605, 1530–1535, 1110–1120, 850–860, 825 cm.$^{-1}$.

Ultraviolet spectrum: 298 m$\mu$ (7030), 237 m$\mu$ (23000).

EXAMPLE 4

3β-hydroxy-14,15β-oxido-bufa-4,20(21),22(23)-trienolide(14,15β-oxido-scillarenone)

130 mg. of 14,15β-oxido-scillarenone were dissolved in 10 ml. of absolute tetrahydrofurane, the solution was combined at −10° C. with a solution of 873 mg. of $$LiAlH[OC(CH_3)_3]_3$$

in 3.2 ml. of tetrahydrofurane. After having allowed the whole to react for 1 hour at room temperature, the mixture was poured into 80 ml. of water, filtered off, the filtrate was extracted with chloroform, the extract was washed, dried and evaporated. The residue that remained behind was dissolved hot in a small amount of acetone and after the solution had cooled, it was combined with ether. 120 mg. of product melting at 163–165° C. were obtained.

Infrared spectrum: 3420–3460, 1700–1750, 1625, 1535 cm.$^{-1}$.

Ultraviolet spectrum: 297 m$\mu$ (4160).

EXAMPLE 5

3-oxo-14,15β-oxido-bufa-4,20(21),22(23)-trienolide (14,15β-oxido-scillarenone)

200 mg. of crude 3-oxo-14β-hydroxy-15α-bromo-bufa-4,20(21),22(23)-trienolide (prepared by the reaction of 14-anhydroscillarenone with perchloric acid and N-bromoacetamide in dioxane at 15° C. with exclusion of light) were chromatographed on acid aluminum oxide having the activity degree II. Elution was effected with benzene and methylene chloride, the eluates were evaporated to dryness and the residue was triturated with ether. Crystals melting at 169–172° C. were obtained.

We claim:
1. 3-oxo-14,15β-oxido-bufa-4,20(21),22(23)-trienolide.
2. 3β - hydroxy - 14,15β - oxido - bufa - 4,20(21),22(23)-trienolide.

References Cited

UNITED STATES PATENTS 2,930,791    3/1960    Meister et al. _____ 260—239.57
3,420,820    1/1969    Stache et al. _____ 260—239.57

OTHER REFERENCES

Fieser et al: Steroids, pp. 754–756 (1959).

HENRY A. FRENCH, Primary Examiner

U.S. Cl. X.R.

260—239.55 R, 397.47, 999